United States Patent [19]
Dunham

[11] Patent Number: 5,992,228
[45] Date of Patent: Nov. 30, 1999

[54] METHOD FOR DETERMINING RESISTIVITY DERIVED POROSITY AND POROSITY DERIVED RESISTIVITY

[76] Inventor: Lanny L. Dunham, 15100 Ella Blvd. Apt. 1602, Houston, Tex. 77090

[21] Appl. No.: 08/947,810

[22] Filed: Oct. 9, 1997

Related U.S. Application Data

[60] Provisional application No. 60/029,002, Oct. 23, 1996.

[51] Int. Cl.$^6$ .................................................. E21B 49/00
[52] U.S. Cl. ........................................................ 73/152.05
[58] Field of Search ........................... 73/152.05, 152.06; 364/422

[56] References Cited

U.S. PATENT DOCUMENTS

| | | | |
|---|---|---|---|
| 3,180,141 | 4/1965 | Alger | 73/152.05 |
| 4,435,977 | 3/1984 | Gournay | 73/152.05 |
| 4,584,874 | 4/1986 | Ruhovets | 73/152.06 |
| 4,594,887 | 6/1986 | Fertl et al. | 73/152.06 |
| 4,752,882 | 6/1988 | Givens | 73/152.05 |
| 4,756,189 | 7/1988 | Fertl et al. | 73/152.05 |
| 4,903,527 | 2/1990 | Herron | 73/152.05 |

*Primary Examiner*—Richard Chilcot
*Assistant Examiner*—Jewel V. Thompson
*Attorney, Agent, or Firm*—Jackie Lee Duke

[57] ABSTRACT

An improved model and method for analyzing oil and gas well logs is disclosed. This method allows a log analyst to make an accurate interpretation of a well log in oil and gas bearing shaly sand formations by providing a means to correct for missing or faulty data. The present invention provides an improved model and method for determining resistivity when porosity is known and for determining porosity when resistivity is known. This methodology allows the determination of water saturation in a shaly sandstone formation using either resistivity, bulk volume clay or porosity data as a single input. Resistivity data can be corrected using density porosity. The combination of both resistivity and density porosity data in any well will allow corrections to questionable open hole log data. Correction of resistivity data for conductive clays, thin bed effects and hole angle is allowed.

8 Claims, 5 Drawing Sheets

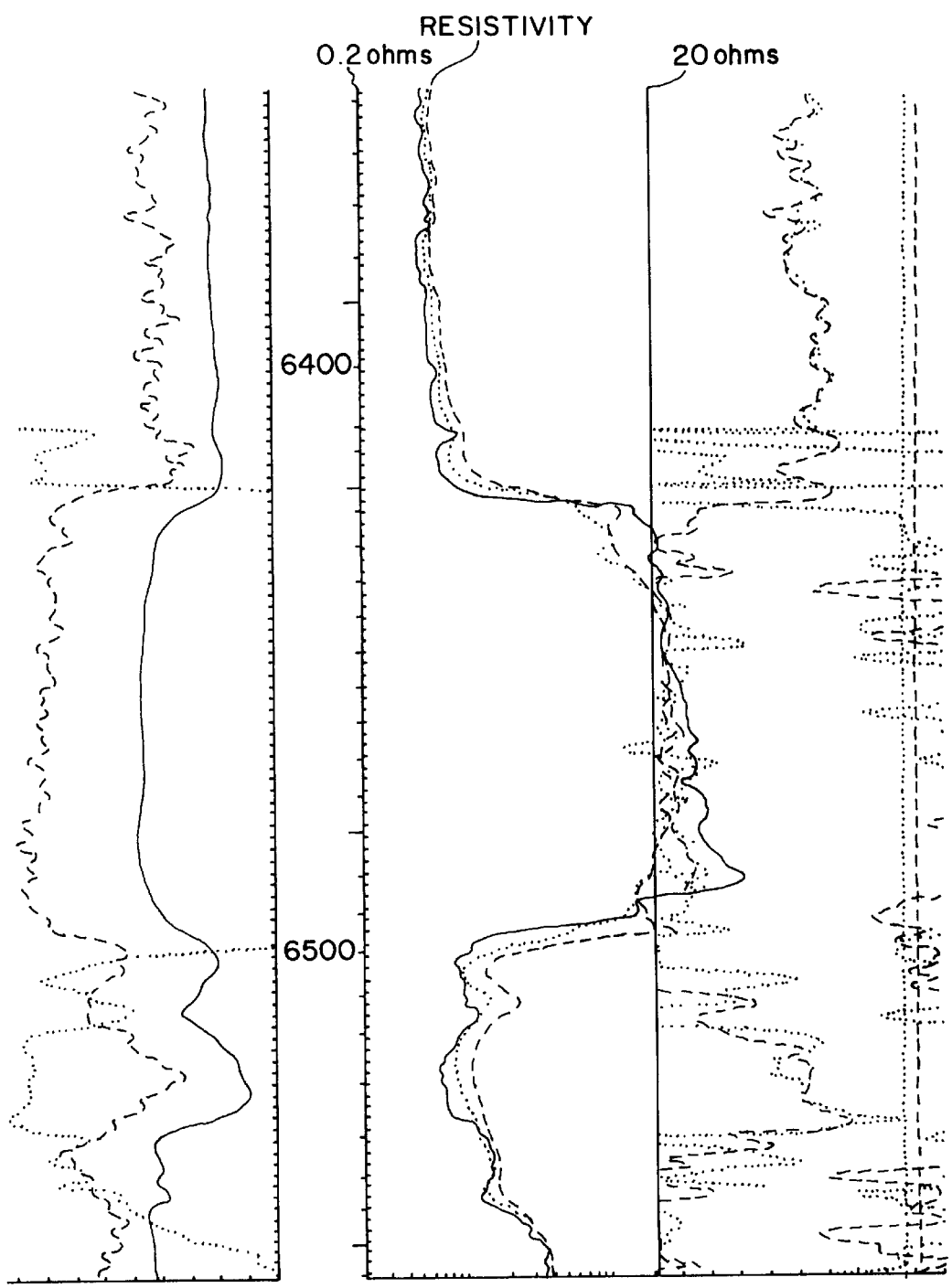

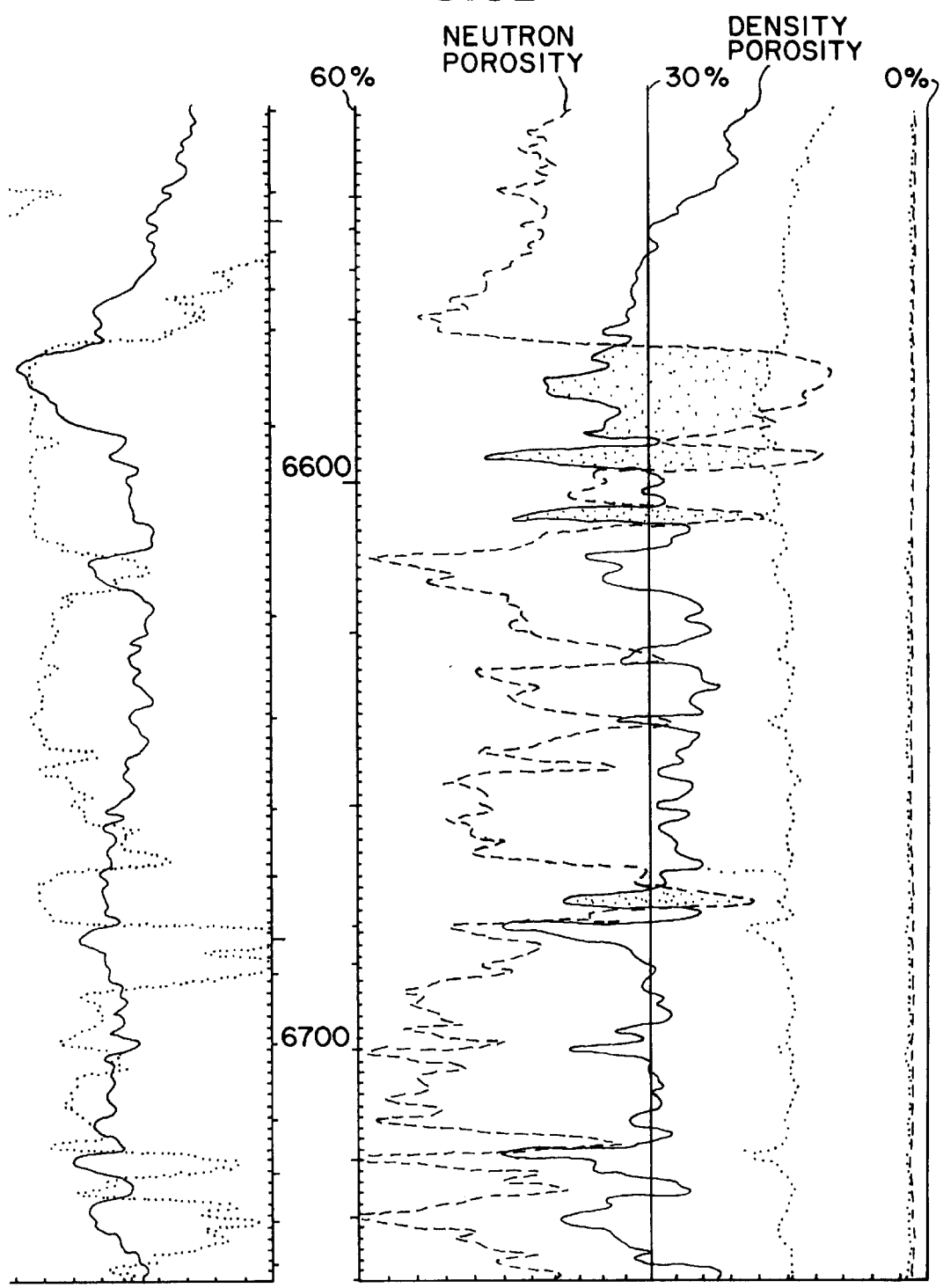

METHOD FOR DETERMINING RESISTIVITY DERIVED POROSITY AND POROSITY DERIVED RESISTIVITY

This application claims the benefit of U.S. Provisional Application Ser. No. 60/029,002, filed Oct. 23, 1996.

BACKGROUND OF THE INVENTION

1. Field of the Invention

This invention relates to a novel method for analyzing oil and gas well logs. The method allows a log analyst to make an accurate interpretation of a well log in oil and gas bearing shaly sand formations by providing a means to correct for missing or faulty data. A frequent problem confronting the log analyst is the ability to make an accurate interpretation because of missing or incorrect data. Accurate porosity data is often not available. Correction of resistivity data for conductive clays, thin bed effects and hole angle is often needed. The methodology described below provides these answers in shaly oil and gas bearing sands.

2. Description of Related Art

The article entitled "Electrical Conductivities in Oil-Bearing Shaly Sand Accurately Described with the SATORI Saturation Model", (A. de Kuijper, R. K. J. Sandor, J. P. Hofman, J. M. V. A. Koelman, P. Hofstra and J. A. de Waal. *The Log Analyst*. September-October 1996, Vol. 37, No. 5, pp. 22–32), is an example of the technology currently known. These prior methods all fail in one or more respects to address the problems described.

SUMMARY OF THE INVENTION

In view of the disadvantages with the known types of well log analysis models, the present invention provides an improved model and method for determining resistivity when porosity is known and for determining porosity when resistivity is known.

The method of the current invention is based upon a model of an oil bearing shale and sandstone formation. Existing well logs are used and graphs of porosity versus resistivity and bulk clay volume versus resistivity are developed. This data is plotted as a single graph for ease of use. Raw well log data may then be corrected using this graph. If a correction to porosity data is required, the measured resistivity value is used as an input to the graph to obtain bulk clay volume (V (cl)). The bulk clay volume parameter is used to obtain effective porosity from the equation: Effective Porosity=Maximum Porosity [1−V (cl)]. Similarly, if a correction to resistivity data is needed, the measured density porosity value corrected for hydrocarbons is used as an input to the graph to obtain the resistivity value. Alternatively, bulk clay volume (V (cl)) may be used from the equation: Bulk clay volume=[maximum porosity−corrected density porosity]/[maximum porosity]. The bulk clay volume so calculated is used as an input to the graph to obtain resistivity. The resistivity of surrounding shale is added to the resistivity read from the graph to obtain the corrected resistivity. This methodology will allow the correction of resistivity or porosity data. The combination of both resistivity and density porosity data in any well will allow corrections to questionable open hole log data. Use of this methodology will give the log analyst a completely new way to correct and interpret shaly sand log data.

It is a principal object of the present invention to provide a novel model and method for correcting resistivity and porosity data obtained from well logs in a hydrocarbon bearing formation.

Another object of the present invention is to provide a novel method for correcting resistivity data to compensate for conductive clays, thin bed effects and hole angle.

A further object of the present invention is to provide an improved method for determining the sweep efficiency of depleted reservoirs with water drive.

BRIEF DESCRIPTION OF THE DRAWINGS

These and other objects and advantages of the present invention are set forth below and further made clear by reference to the drawings, wherein:

FIG. 2A is a graph of a representative well resistivity log at a well bore depth in the range of 6,350' to 6,556'.

FIG. 3B is a graph of a representative well neutron/density porosity log at a well bore depth in the range of 6,536' to 6,742'.

DESCRIPTION OF THE PREFERRED EMBODIMENT

The RESISTIVITY DERIVED POROSITY model assumes a matrix composed of water wet clay, quartz (grain and silt sized) and saline water. The clay and silt sized particles combine to make shale. With the gradual replacement of clay by quartz, a point is reached where the quartz is in sufficient quantities to establish grain to grain contact and effective porosity is developed. The more shale present in this sand, the closer resistivity readings are to the resistance of the surrounding shale. The cleaner the sand, the less resistive the sand becomes. This combination of materials will never produce a resistivity reading greater than the resistivity reading of shale. This model in addition assumes that significant amounts of secondary cementation with materials such as calcite is not present.

Consider the effect on the resistivity curves when hydrocarbons replace the movable water in the model above and the matrix is now composed of water wet clay, water wet quartz (grain and silt sized) and hydrocarbons. The resistance of this mixture will almost always read larger than the resistance of the surrounding shale. One common reason an interval would have a resistivity approximately the same as or less than surrounding shale is highly conductive clay in the sand. A solution for this problem will be addressed later in the application. When shale or clay in the sand is reduced, more porosity is developed and more space is available for hydrocarbons. This will cause the resistance of the matrix to increase. The intervals with resistivity greater than surrounding shale delineate the zones that have the best chance of being productive, i.e., hydrocarbon producing.

It is well known to those of ordinary skill in the art that a porosity-resistivity relationship exists. Whenever resistivity logs in strata composed of sand, shale, water and hydrocarbons are analyzed, a large resistance highlights a sand as hydrocarbon producing. The resistivity increase is the primary reason to run porosity logs.

Figure 1:
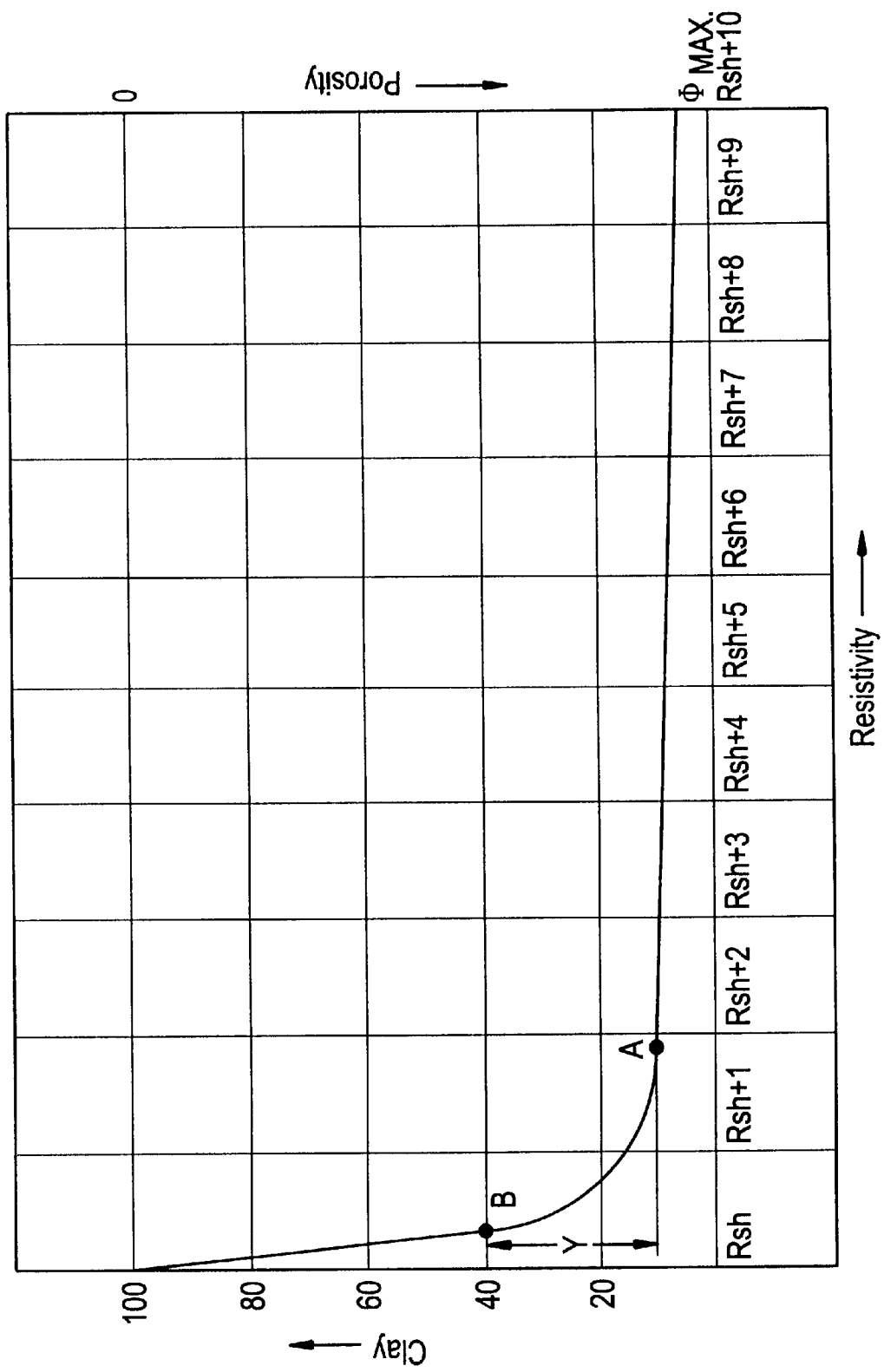
FIG. 1 is a graph showing the unique relationship between the bulk clay volume, porosity and amount of resistivity greater than that of the surrounding oil shale formation in accordance with the present invention.

This relationship between resistivity greater than that of surrounding shale and porosity in a hydrocarbon filled shaly sandstone can be plotted and is presented in FIG. 1. It is not presumed this graph is good for all shaly sands everywhere in the world although the basic shape will remain the same. FIG. 1 has been used in the Gulf of Mexico region (onshore and offshore) where maximum porosity is in the 24%–36% range. FIG. 1 can be used by inserting a maximum porosity value for the interval of interest. The maximum porosity is the porosity of a clean sandstone at this depth seen in the area of interest. This is all the calibration required.

There is a linear relationship between resistivity greater than surrounding shale and porosity until a minimum reservoir quality rock is achieved. This minimum reservoir quality rock occurs when the resistivity is approximately 0.3 ohms greater than the resistivity of the surrounding shale and a threshold porosity occurs at approximately 40% bulk volume clay. As seen in FIG. 1, nonlinear changes occur between 40% and 10% bulk volume clay. The relationship between porosity or bulk volume clay and resistivity greater than that of the surrounding shale becomes linear again in the 10%–0% bulk volume clay range. FIG. 1 is plotted with the assumption of a maximum resistivity of 20 ohms greater than that of the surrounding shale in a clean hydrocarbon filled sandstone. This maximum resistivity is difficult to determine because the value appears to vary with individual logging companies and tool types. The maximum resistance in a hydrocarbon filled sandstone would be dependent upon the surface area of the sand that is a function of grain size.

Most resistivity change occurs during the first 10% increase in bulk volume clay. 10% clay will reduce the resistivity log approximately 18 ohms. This loss of 18 ohms occurs while the porosity is decreased by 10% from the maximum value.

This model assumes the shale within a sandstone is dispersed or structural and any shale laminations that occur surrounds the sand of interest. All resistivity increases greater than that of the surrounding shale is from hydrocarbon filled porosity. Bulk volume clay is computed from the bulk density curve corrected for hydrocarbon effect or from the resistivity logs. The gamma ray and spontaneous potential curves are used only to assist in identifying intervals of interest from shale.

REPRESENTATIVE EXAMPLES OF USE

EXAMPLE 1

RESISTIVITY DERIVED POROSITY MEASUREMENT

Porosity may be determined using FIG. 1 with resistivity as an input. The porosity determined using FIG. 1 with resistivity as an input is called RESISTIVITY DERIVED POROSITY or RDP porosity. To solve for effective porosity or RPD porosity using resistivity logs as an input, the following steps are taken:

1. Enter the resistivity value greater than surrounding shale in FIG. 1 and where it intersects the graph line read V (cl) (Bulk clay volume).
2. Calculate the Effective Porosity using the equation:

Effective Porosity=Maximum Porosity [1−V (cl)].

Maximum porosity is determined from off set well data or local knowledge.

LOG EXAMPLES—RESISTIVITY DERIVED POROSITY

The resistivity derived porosity method may be used when no porosity data is available. When the porosity logs are not reading correctly, the resistivity log is used to determine effective porosity.

Figure 2B:
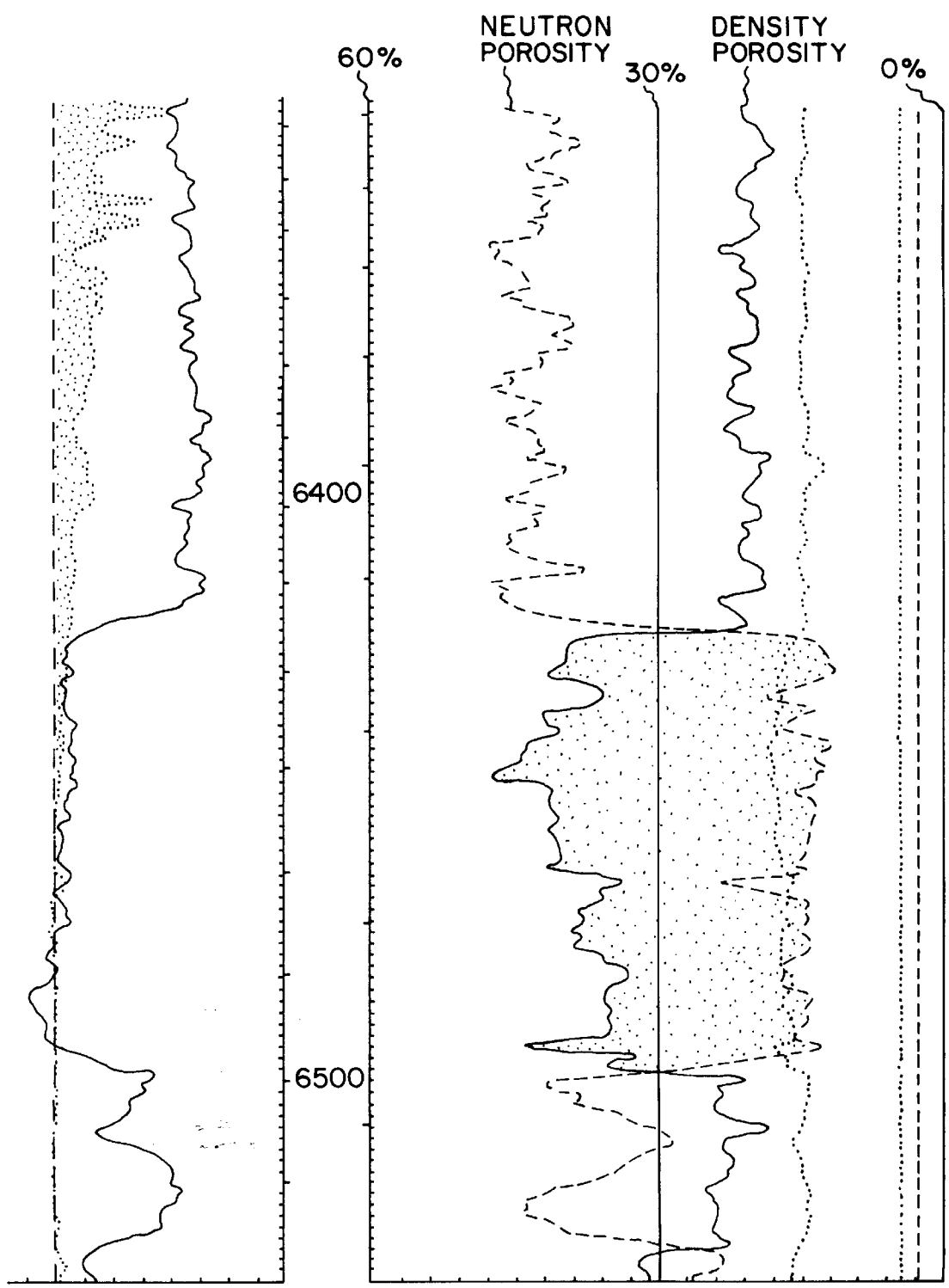
FIG. 2B is a graph of a representative well neutron/density porosity log at a well bore depth in the range of 6,330' to 6,540'.

An example of an incorrect tool response is shown below. In FIG. 2A, a high resistance sand is present in the 6,420'–6,498' interval. The gamma ray, spontaneous potential, resistivity and sonic logs indicate this sand to be homogeneous with no abrupt porosity changes. Note the deep resistivity decrease and large separation of the resistivity data in the 6,422'–6,438' that is probable hole angle effect. The sidewall cores describe this sand as clean with no detectable calcite present. In FIG. 2B, hydrocarbon corrected density porosity is significantly decreased in the 6,422'–6,445' and 6,448'–6,493' intervals. A likely explanation is this sand has deep mud filtrate invasion that is affecting the Density porosity and not the Neutron porosity. Resistivity derived porosity is computed below for this sand and compared with measured porosity. A maximum porosity of 33% is used for this sand. Resistivity greater than 20 ohms is set to 20 ohms.

Maximum porosity is the largest expected porosity for a clean sand at this depth in this well. This can be found in the well of interest or from off set information.

6,420'–6,498' Average density porosity corrected for hydrocarbon effect=29.6%

Average resistivity of interval=17.7 ohms

Resistivity of surrounding shale=0.6 ohms

Resistance greater than surrounding shale=17.1 ohms

V (cl)=2% (from FIG. 1)

Effective porosity=33[1−0.02]=32.3%

Porosity difference=2.7 p. u.

This represents a loss of 2.7 porosity units if the deep mud filtrate invasion had not been recognized and corrections made using the resistivity data.

Figure 3A:
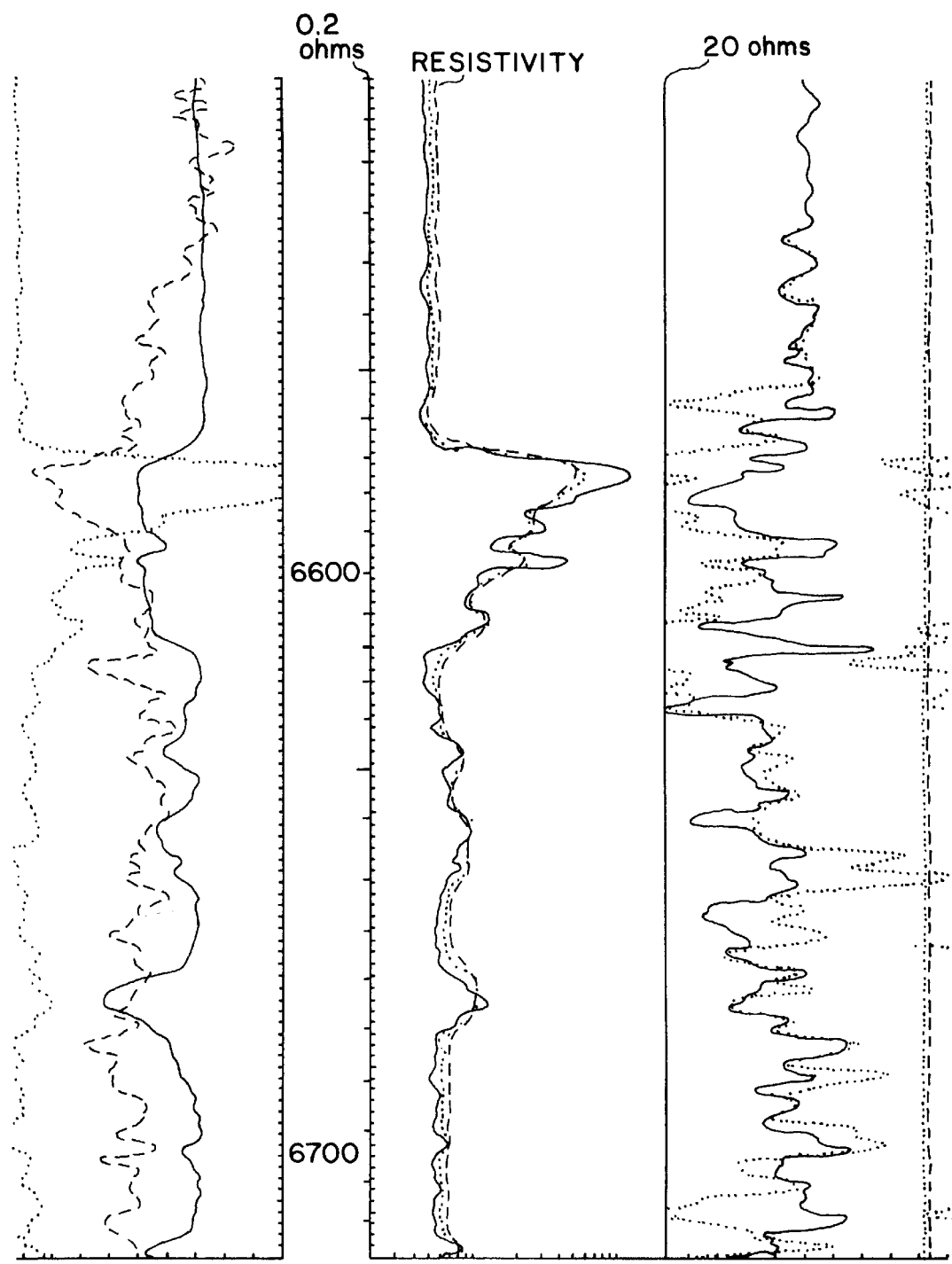
FIG. 3A is a graph of a representative well resistivity log at a well bore depth in the range of 6,514' to 6,718'.

FIG. 3A is another example of deep invasion that is affecting the density porosity in the 6,578'–6,595' interval. There were nine sidewall cores recovered from this sand and only one was described as slightly calcitic. A maximum porosity of 33% is used for this interval and a resistivity of surrounding shale=0.6 ohms. Listed below are the measured porosity and the Resistivity Derived Porosity [RDP].

| DEPTH | DENSITY-NEUTRON POROSITY | RDP POROSITY |
|---|---|---|
| 6,578'–6,594' | 28.5% | 30.0% |

The Density-Neutron porosity in FIG. 3B underestimates the in-situ porosity by at least 1.5 porosity units. The actual in-situ porosity may be even larger because the resistivity data is probably affected by thin bed effect and hole angle.

EXAMPLE 2

POROSITY DERIVED RESISTIVITY MEASUREMENT

There are occasions when the resistivity curves are incorrect because of conductive clays present in the sand, thin bed effects and deep invasion or when the bore hole and formation of interest intersect at a high angle. FIG. 1 can be used to correct the resistivity curve. This is accomplished using the following steps:

1. Enter the density porosity corrected for hydrocarbons value in FIG. 1 and where it intersects the graph line read the resistivity greater than surrounding shale or compute bulk clay volume using the equation: Bulk clay volume=[maximum porosity−corrected density porosity]/[maximum porosity].

2. Enter bulk clay volume in FIG. 1 and where this data intersects the graph line, read resistance.
3. Add resistivity of surrounding shale to resistance found in step 2 to obtain the corrected resistivity.

LOG EXAMPLES—POROSITY DERIVED RESISTIVITY

A resistivity correction is required below 6,694' in FIG. 3A. The resistivity data is reading too low because of thin bed effect, hole angle and/or conductive clays. Listed below are some corrections to the resistivity versus depth:

| DEPTH | LOG RESISTIVITY | CORRECTED RESISTIVITY |
| --- | --- | --- |
| 6,597' | 2.3 ohms | 20.6 ohms |
| 6,603' | .9 ohms | 9.6 ohms |
| 6,607' | 1.3 ohms | 20.6 ohms |
| 6,631' | .9 ohms | 3.6 ohms |
| 6,643' | 1.0 ohms | 2.8 ohms |
| 6,648' | .9 ohms | 1.5 ohms |
| 6,669' | 1.0 ohms | 2.2 ohms |
| 6,671' | 1.0 ohms | 1.6 ohms |
| 6,674' | 1.05 ohms | 5.6 ohms |

It is obvious the hydrocarbon saturation of this sand would be grossly underestimated if open hole resistivity data was used.

It should be noted that a RESISTIVITY DERIVED POROSITY or a POROSITY DERIVED RESISTIVITY calculation can be made using any spacing desired. The method will work correctly using a quarter or half foot sample rate instead of the average of an interval shown above.

This method has been used with logs varying in age from the early 1950's to modern suites of logs. Where conductive clays, thin bed effects or hole angle have not played an important role, average computed and measured porosity have had less than a ±1.5 porosity difference with many sands having less than a ±0.5 porosity difference.

The method of use of my novel method for analyzing oil and gas well logs will be readily understood from the foregoing description and it will be seen that I have provided an improved method for determining resistivity when porosity is known and for determining porosity when resistivity is known in shaly oil and gas bearing sands. This methodology will allow the determination of water saturation in a shaly sandstone formation using either resistivity, bulk volume clay or porosity data as a single input. Resistivity data can be corrected using density porosity. Additionally, the combination of both resistivity and density porosity data in any well will allow corrections to questionable open hole log data. Use of this methodology will provide the log analyst with a completely new way to correct and interpret shaly sand log data. Furthermore, while the invention has been shown and described with respect to certain preferred embodiments, it is obvious that equivalent alterations and modifications will occur to others skilled in the art upon the reading and understanding of the specification. The present invention includes all such equivalent alterations and modifications, and is limited only by the scope of the appended claims.

What is claimed is:

1. A method for determining a corrected porosity value using resistivity data in shaly oil and gas bearing sands well logs, comprising the steps of:
   (a) measuring the resistivity value at a known well log depth;
   (b) calculating the difference between said measured resistivity value and the resistivity of the adjacent shale in the formation;
   (c) determining the percentage of bulk clay volume from a plot of resistivity versus percentage of bulk clay volume using said calculated difference between said measured resistivity value and the resistivity of the adjacent shale in the formation as an input; and,
   (d) calculating the effective porosity using said percentage of bulk clay volume in the formula: Effective porosity= Maximum porosity [1−Bulk clay volume].

2. A method for determining a corrected porosity value using resistivity data in shaly oil and gas bearing sands well logs according to claim 1, further comprising the steps of:
   (e) repeating steps a–d for all well depths of interest to obtain a corrected well log.

3. A method for correcting resistivity curves in shaly oil and gas bearing sands well logs using measured porosity data, comprising the steps of:
   (a) determining a resistivity value that is the difference between the resistivity of the surrounding shale and a resistivity determined from a plot of resistivity versus percentage porosity using a density porosity corrected for hydrocarbons value for a known well log depth as an input; and,
   (b) adding the resistivity of surrounding shale to said determined resistivity value to calculate a corrected resistivity.

4. A method for correcting resistivity curves in shaly oil and gas bearing sands well logs using measured porosity data according to claim 3, further comprising the steps of:
   (c) repeating steps a–b for all well depths of interest to obtain a corrected well log.

5. A method for correcting resistivity curves in shaly oil and gas bearing sands well logs using measured porosity data, comprising the steps of:
   (a) determining a resistivity value that is the difference between the resistivity of the surrounding shale and a resistivity determined from a plot of resistivity versus percentage porosity using density porosity corrected for hydrocarbons value for a known well log depth as an input; and,
   (b) adding the resistivity of surrounding shale to said determined resistivity value to calculate a corrected resistivity.

6. A method for correcting resistivity curves in shaly oil and gas bearing sands well logs using measured porosity data according to claim 5, further comprising the steps of:
   (c) repeating steps a–b for all well depths of interest to obtain a corrected well log.

7. A method for correcting resistivity curves in shaly oil and gas bearing sands well logs using measured porosity data, comprising the steps of:
   (a) computing bulk clay volume using the equation: Bulk clay volume=[maximum porosity−corrected density porosity]/[maximum porosity];
   (b) using said computed bulk clay volume as an input to a graph of bulk clay volume versus resistivity to determine a resistivity value; and,
   (c) adding the resistivity of surrounding shale to said determined resistivity value to calculate a corrected resistivity.

8. A method for correcting resistivity curves in shaly oil and gas bearing sands well logs using measured porosity data according to claim 7, further comprising the steps of:
   (d) repeating steps a–c for all well depths of interest to obtain a corrected well log.

* * * * *